(12) United States Patent
Lemkin et al.

(10) Patent No.: US 6,868,726 B2
(45) Date of Patent: Mar. 22, 2005

(54) POSITION SENSING WITH IMPROVED LINEARITY

(75) Inventors: Mark A. Lemkin, El Cerrito, CA (US); Thor N. Juneau, Berkeley, CA (US); William A. Clark, Fremont, CA (US); Allen W. Roessig, Fremont, CA (US)

(73) Assignee: Analog Devices IMI, Inc., Berkeley, CA (US)

( * ) Notice: Subject to any disclaimer, the term of this patent is extended or adjusted under 35 U.S.C. 154(b) by 0 days.

(21) Appl. No.: 09/765,521

(22) Filed: Jan. 18, 2001

(65) Prior Publication Data

US 2001/0032508 A1 Oct. 25, 2001

Related U.S. Application Data

(60) Provisional application No. 60/177,114, filed on Jan. 20, 2000.

(51) Int. Cl.$^7$ ............................................. G01P 15/125
(52) U.S. Cl. .................................................. 73/514.32
(58) Field of Search ................. 324/684; 200/61.45 R; 73/514.32

(56) References Cited

U.S. PATENT DOCUMENTS

| | | | |
|---|---|---|---|
| 3,709,042 A | 1/1973 | Lee et al. ................. | 73/516 R |
| 3,797,320 A | 3/1974 | Clampitt ...................... | 73/496 |
| 3,954,024 A | 5/1976 | Staats ......................... | 74/5.41 |
| 4,345,474 A | 8/1982 | Deval ........................ | 73/517 B |
| 4,435,737 A | 3/1984 | Colton ....................... | 361/280 |
| 4,483,194 A | 11/1984 | Rudolf ...................... | 73/517 R |
| 4,633,223 A | * 12/1986 | Senderowicz ............... | 327/554 |
| 4,679,434 A | 7/1987 | Stewart ..................... | 73/517 B |
| 4,711,128 A | 12/1987 | Boura ....................... | 73/517 B |
| 4,736,629 A | 4/1988 | Cole ........................ | 73/517 R |

(List continued on next page.)

OTHER PUBLICATIONS

Henrion, W., et al., "Wide Dynamic Range Direct Digital Accelerometer," *IEEE Solid–State Sensor and Actuator Workshop*, Hilton Head Island, South Carolina, Jun. 1990, pp. 153–157.

(List continued on next page.)

*Primary Examiner*—John E. Chapman
(74) *Attorney, Agent, or Firm*—Vierra Magen Marcus Harmon & DeNiro LLP

(57) ABSTRACT

A position-sense interface with improved transfer characteristics. Electrical position detection circuitry, which may be substantially time-multiplexed or frequency-multiplexed, comprises a differential charge integrator with input-sensed output-driven common mode feedback. By placing sense capacitors in the feedback loop of said differential charge integrator with input-sensed output-driven common mode feedback, improved position sensing linearity is attained. In some embodiments of the invention, a compensating charge is applied to the sense capacitors in a fashion that minimizes the output common mode shift of the opamp. The magnitude of the compensating charge may be preset at a substantially constant level, or derived by a feedback loop that measures the shift in output common mode voltage in response to an excitation signal and adjusts the magnitude of the compensating charge to drive said shift towards zero.

The invention has numerous advantages for acceleration measurement in both open-loop and force-balanced accelerometers, as well as rotation rate measurement in a vibratory rate gyroscope. Other applications in which the invention may prove advantageous include: motion detection for an oscillation-sustaining feedback loop; position detection of actuators, including micro-actuators used for effecting controlled motion of a disk-drive read/write head, or effecting controlled motion of an optically active device, such as a positionable mirror for use in fiber-optic data communications; and application of electrostatic forces for large motions.

19 Claims, 11 Drawing Sheets

U.S. PATENT DOCUMENTS

| | | | | |
|---|---|---|---|---|
| 4,922,756 A | | 5/1990 | Henrion | 73/517 R |
| 4,932,261 A | | 6/1990 | Henrion | 73/517 B |
| 5,054,320 A | | 10/1991 | Yvon | 73/517 B |
| 5,095,752 A | | 3/1992 | Suzuki et al. | 73/517 R |
| 5,115,291 A | | 5/1992 | Stokes | 357/26 |
| 5,134,881 A | | 8/1992 | Henrion et al. | 73/517 R |
| 5,146,389 A | | 9/1992 | Ristic et al. | 361/283 |
| 5,239,871 A | | 8/1993 | Reidemeister et al. | 73/517 R |
| 5,281,860 A | * | 1/1994 | Krenik et al. | 327/407 |
| 5,343,766 A | | 9/1994 | Lee | 73/862.61 |
| 5,345,824 A | | 9/1994 | Sherman et al. | 73/517 B |
| 5,353,641 A | | 10/1994 | Tang | 73/517 R |
| 5,428,352 A | | 6/1995 | Bennett | 340/870.37 |
| 5,440,939 A | | 8/1995 | Barny et al. | 73/862.61 |
| 5,447,068 A | | 9/1995 | Tang | 73/514.32 |
| 5,473,946 A | | 12/1995 | Wyse et al. | 73/514.18 |
| 5,495,761 A | | 3/1996 | Diem et al. | 73/514.32 |
| 5,506,175 A | | 4/1996 | Zhang et al. | 437/228 |
| 5,511,420 A | | 4/1996 | Zhao et al. | 73/514.18 |
| 5,540,095 A | | 7/1996 | Sherman et al. | 73/514.18 |
| 5,563,343 A | | 10/1996 | Shaw et al. | 73/514.18 |
| 5,565,625 A | | 10/1996 | Howe et al. | 73/514.16 |
| 5,569,852 A | | 10/1996 | Marek et al. | 73/514.32 |
| 5,574,222 A | | 11/1996 | Offenberg | 73/514.32 |
| 5,578,755 A | | 11/1996 | Offenberg | 73/514.32 |
| 5,594,612 A | | 1/1997 | Henrion | 341/120 |
| 5,600,066 A | | 2/1997 | Torregrosa | 73/514.18 |
| 5,605,598 A | | 2/1997 | Greiff | 156/630.1 |
| 5,612,494 A | * | 3/1997 | Shibano | 341/118 |
| 5,616,523 A | | 4/1997 | Benz et al. | 438/50 |
| 5,620,931 A | | 4/1997 | Tsang et al. | 438/50 |
| 5,627,317 A | | 5/1997 | Offenberg et al. | 73/514.32 |
| 5,627,318 A | | 5/1997 | Fujii et al. | 73/514.32 |
| 5,631,422 A | | 5/1997 | Sulzberger et al. | 73/514.32 |
| 5,656,778 A | | 8/1997 | Roszhart | 73/504.04 |
| 5,661,240 A | * | 8/1997 | Kemp | 73/514.32 |
| 5,723,353 A | | 3/1998 | Muenzel et al. | 437/51 |
| 5,756,901 A | | 5/1998 | Kurle et al. | 73/777 |
| 5,760,305 A | | 6/1998 | Greiff | 73/514.15 |
| 5,796,001 A | | 8/1998 | Greiff et al. | 73/504.16 |
| 5,817,942 A | | 10/1998 | Greiff | 73/514.01 |
| 5,959,208 A | | 9/1999 | Muenzel et al. | 73/514.32 |
| 5,986,497 A | * | 11/1999 | Tsugai | 327/554 |
| 6,035,694 A | | 3/2000 | Dupuie et al. | 73/1.38 |
| 6,035,714 A | | 3/2000 | Yazdi et al. | 73/514.32 |
| 6,055,858 A | * | 5/2000 | Muenzel et al. | 73/514.32 |
| 6,230,563 B1 | * | 5/2001 | Clark et al. | 327/337 |
| 6,230,566 B1 | * | 5/2001 | Lee et al. | 73/514.32 |
| 6,253,612 B1 | * | 7/2001 | Lemkin et al. | 73/504.02 |
| 6,291,875 B1 | * | 9/2001 | Clark et al. | 257/622 |
| 6,301,965 B1 | * | 10/2001 | Chu et al. | 73/514.18 |
| 6,386,032 B1 | * | 5/2002 | Lemkin et al. | 73/504.02 |
| 6,639,414 B2 | * | 10/2003 | Lien | 324/658 |

OTHER PUBLICATIONS

Sherman, S.J. et al., "A Low Cost Monolithic Accelerometer; Product/Technology Update," *International Electron Devices Meeting,* San Francisco, California, Dec. 1992, pp. 501–504.

Smith, T. et al., "A 15b Electromechanical Sigma–Delta Converter for Acceleration Measurements," *IEEE International Solid–State Circuits Conference,* 1994, pp. 160–161.

Warren, K., "High Performance Silicon Accelerometers With Charge Controlled Rebalance Electronics," *IEEE 1996 Position Location and Navigation Symposium,* Atlanta, Georgia, Apr. 1996, pp. 27–30.

Seeger, J.I. et al., "Stabiization of Electrostatically Actuated Mechanical Devices," *IEEE Transducers '97,* Chicago, Illinois, Jun. 1997, pp. 1133–1136.

Lemkin, M.A., *Micro Accelerometer Design with Digital Feedback Control,* Doctoral Thesis, U.C. Berkeley, Fall 1997.

Yazdi, N. et al., "An Interface IC for a Capacitive Silicon Micro–g Accelerometer," *IEEE International Solid–State Circuits Conference,* 1999, pp. 132–133.

Seeger, J.I. et al., "Dynamics and Control of Parallel–Plate Actuators Beyond the Electrostatic Instability," *IEEE Transducers '99,* Sendai, Japan, Jun. 1999, pp. 474–477.

* cited by examiner (a) Top Left, (b) Bottom Left, (c) Top Right (d) Bottom Right

POSITION SENSING WITH IMPROVED LINEARITY

PRIORITY APPLICATION DATA

This application claims priority to provisional application Ser. No. 60/177,114, POSITION SENSING WITH IMPROVED LINEARITY, filed Jan. 20, 2000.

GOVERNMENT INTEREST

This invention was made with Government support under contract #DAAH01-99-C-R215 awarded by DARPA. The Government has certain rights in the invention.

BRIEF DESCRIPTION OF THE INVENTION

This invention relates to an improved measuring device for open-loop and force-balanced accelerometers, and vibratory rate gyroscopes. In addition, the invention further relates to: position or velocity detection in an oscillation-sustaining feedback loop; position detection of actuators, including micro-actuators used for effecting controlled motion of a disk-drive read/write head, or effecting controlled motion of an optically active device, such as a positionable mirror used in data communications. The invention further relates to microelectromechanical systems formed by one or more micromachining operations.

This invention utilizes charge-based sensing to attain a linear position-input to voltage-output transfer characteristic.

BACKGROUND OF THE INVENTION

Accelerometers are sensors that measure acceleration. Accelerometers can be designed to measure rotational or translational acceleration. Vibratory rate gyroscopes are a type of accelerometer in which one or more proof-masses are forced into oscillation and a Coriolis acceleration is detected in response to a rate input. Accelerometers and rate gyroscopes have many uses in many commercial, military, and scientific applications including, but not limited to, inertial navigation, vehicular safety systems such as airbags, ride comfort control, platform stabilization, tilt sensing, vibration monitoring, shock and impact measurement, and weapons fusing.

The heart of a displacement-based accelerometer is a mechanical proof-mass. Under an applied acceleration, this passive mechanical device moves with respect to the substrate. For an accelerometer with a linear suspension, it may be shown that for frequencies below the proof-mass resonant frequency along the sensitive axis, $\omega_n$, the displacement of the proof-mass from its nominal position with respect to the substrate is given by $1/\omega_n^2$ times the applied acceleration. By measuring the displacement of the proof-mass with an electrical interface, acceleration may be inferred.

A sense-element may be operated either open-loop, or placed into a force-feedback loop. Enclosure of a sense-element in a force-feedback loop is commonly called force-balancing or force-rebalancing. In the open-loop configuration, the accelerometer output is given by the change in relative displacement of the proof-mass multiplied by the gain of the position sense interface. Often piezoelectric materials, piezoresistive materials, or sense capacitors are used in conjunction with an electrical position-sense interface to detect proof-mass displacements.

In the force-balanced configuration the position-sense interface output is used to feed back a force in a manner that tends to restore the proof-mass to a defined nominal position. Note the accelerometer output is not a quantity representative of position, but rather is a quantity representative of the force necessary to keep the proof mass at its nominal position. Because force-balanced accelerometers maintain small displacements for acceleration inputs within the measuring range, electrostatic nonlinearities due to changes in air gap capacitance are attenuated. Closed-loop operation has been used to provide several advantages that are particularly important for miniature micromachined sensors including improved linearity, increased dynamic range, and extended bandwidth. In addition, since the output is the applied force, not displacement, the output typically is less sensitive to device dimensions, such as spring width, making the sensor typically less sensitive to variations in manufacturing. Sense capacitors or piezoelectric materials are often used to apply feedback forces to the proof mass.

Note force-feedback is not practical or even desirable for many applications, however. As full scale ranges rise above approximately 50G, it becomes increasingly difficult to force balance an accelerometer in a manner such that the feedback loop doesn't saturate, especially if electrostatic forces and low-voltage operation (i.e. 5V or less) are used to apply the restoring force feedback. Alternatively, when an application requires a low-cost, small, or simple accelerometer, the increased circuit area or added complexity may preclude usage of force-balanced topologies. Although some applications may not allow for force balancing, many of these same target applications will require good input-output linearity and a wide dynamic range that force balancing provides. Furthermore, it is often desirable that the sensor include a differential sense interface for improved rejection of undesired disturbances, such as power supply fluctuations.

A substantially parallel-plate capacitor is defined here as a capacitor having a nonlinear relationship between capacitance and displacement along an axis of sensitivity; a significant component of capacitance being described by the equation K/g, where K is a geometrically determined constant and g is a characteristic distance between sense electrodes as measured orthogonally from the face of one sense electrode. Substantially parallel-plate capacitors may be advantageous in many applications because in addition to a typically higher sensitivity to changes in air-gap, substantially parallel-plate capacitors typically provide significantly higher air-damping than alternative configurations such as interdigitated comb fingers (see for example Tang et al U.S. Pat. No. 5,025,346 issued Jun. 18, 1991). Higher air damping is beneficial to many applications where underdamped mechanical resonances are undesirable including, but not limited to, accelerometers and open-loop actuators.

FIG. 1 shows an example of a substantially parallel-plate capacitor with conductive electrodes 40 and 41, each electrode having an area A equal to plate length/multiplied by plate width w. When the length and width are substantially greater than the separation gap g, the capacitance, C, between the two plates may be approximated by:

$$C \approx \epsilon_0 A/g$$

As either plate width or plate length approach the gap dimension, the above approximation becomes less accurate, since fringing fields comprise a larger percentage of capacitance. Note that the capacitance is highly nonlinear with a 1/g dependence. To attain a representation of position that is linear, a position sense interface must account for this nonlinearity.

A sense capacitor is defined, within the scope of this document, as one or more substantially parallel-plate capacitors connected in parallel. Note, in certain applications, a substantially parallel-plate capacitor may have gasses between electrodes at a reduced pressure, or vacuum, for lower mechanical damping. Furthermore, substantially parallel-plate capacitors may include between the electrodes any of a number of gasses including, but not limited to, one or more of the following: nitrogen, argon, hydrogen, helium, oxygen, or other gasses or combination of gasses.

Often a position sense interface requires a pair of sense capacitors that change oppositely in value for a displacement in the same direction. A pair of sense capacitors that change in this manner provide a degree of symmetry that may result in reduced offset and drift over temperature. Furthermore, a pair of sense capacitors may enable the use of differential circuit techniques that reject certain environmental noise sources such as power supply ripple.

SUMMARY OF THE INVENTION

The invention, roughly described, comprises a position-sense interface with improved transfer characteristics. In one embodiment of the invention, a single proof-mass includes two electrically decoupled sensing capacitors is shown. Electrical position detection circuitry, which may be substantially time-multiplexed or frequency-multiplexed, comprises a differential charge integrator with input-sensed output-driven common mode feedback. By placing the sense capacitors in the feedback loop of said differential charge integrator with input-sensed output-driven common mode feedback, improved position sensing linearity is attained.

In an alternative embodiment of the invention two or more proof-masses are connected to form two electrically decoupled sensing capacitors.

In yet another embodiment of the invention, a compensating charge is applied to the sense capacitors in a fashion that minimizes the output common mode shift of the opamp. The magnitude of the compensating charge may be set to a substantially constant level, or derived by a feedback loop that measures the shift in opamp output common mode voltage in response to an excitation signal and adjusts the magnitude of the compensating charge to drive said shift towards zero.

The invention has numerous advantages for acceleration measurement in both open-loop and force-balanced accelerometers, as well as rotation rate measurement in a vibratory rate gyroscope. Other applications in which the invention may prove advantageous include: motion detection for an oscillation-sustaining feedback loop; position detection of actuators, including micro-actuators used for effecting controlled motion of a disk-drive read/write head, or effecting controlled motion of an optically active device, such as a positionable mirror for use in fiber-optic data communications; and application of electrostatic forces for large motions.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout all the views of the drawings.

DETAILED DESCRIPTION OF THE INVENTION

Measurement of proof-mass displacement from a nominal position is attained using a differential charge integrator, with novel Input-Sensed Output-Driven Common Mode Feedback loop (termed ISODCMFB), in conjunction with two or more substantially parallel-plate capacitors. The invention comprises a charge integrator having an ISODCMFB circuit and one or more proof-masses, each proof-mass having at least one substantially parallel-plate capacitor that varies with displacement of the proof-mass along a sensitive axis.

Figure 1:
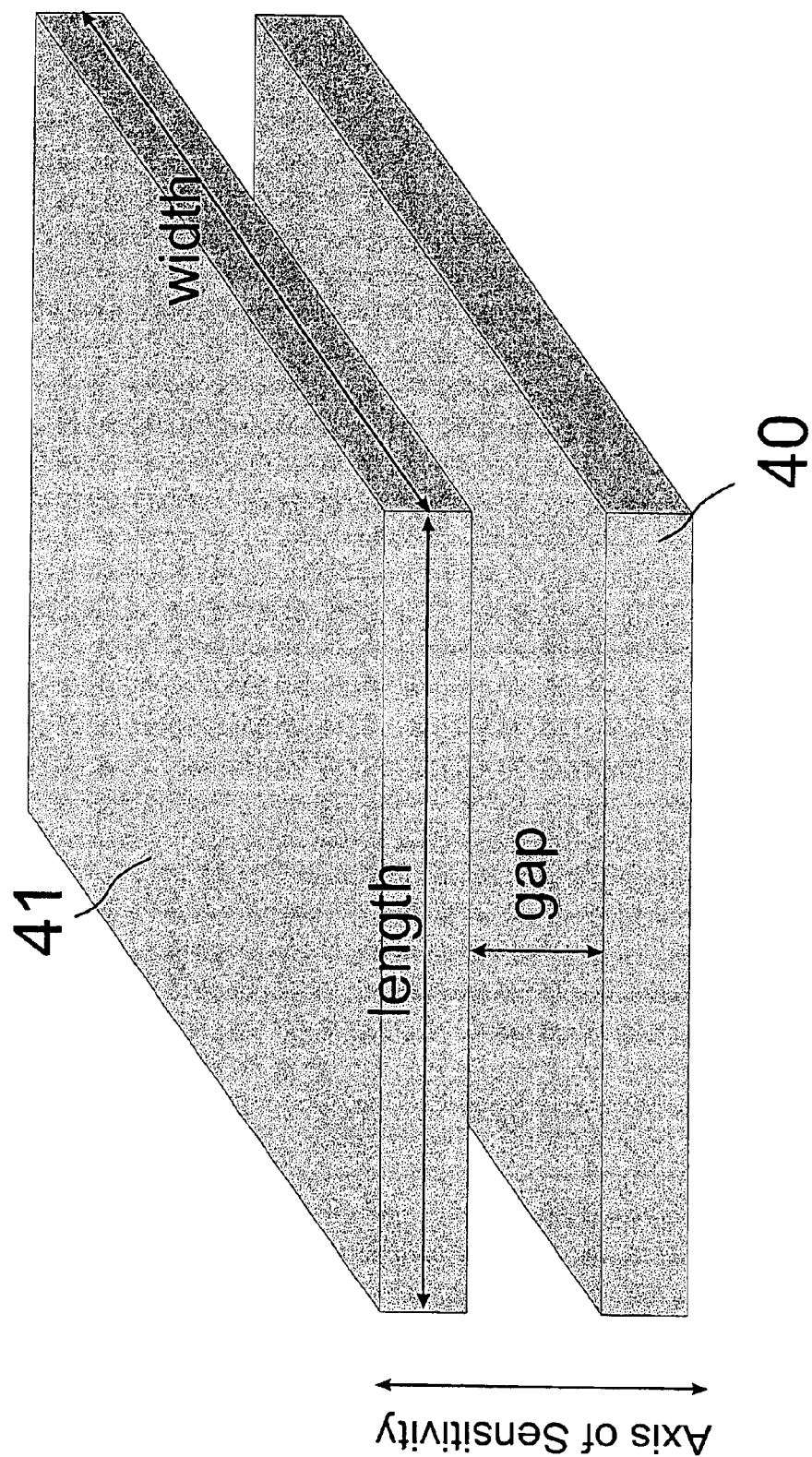
FIG. 1 is a perspective view of a substantially-parallel plate capacitor.
Figure 2:
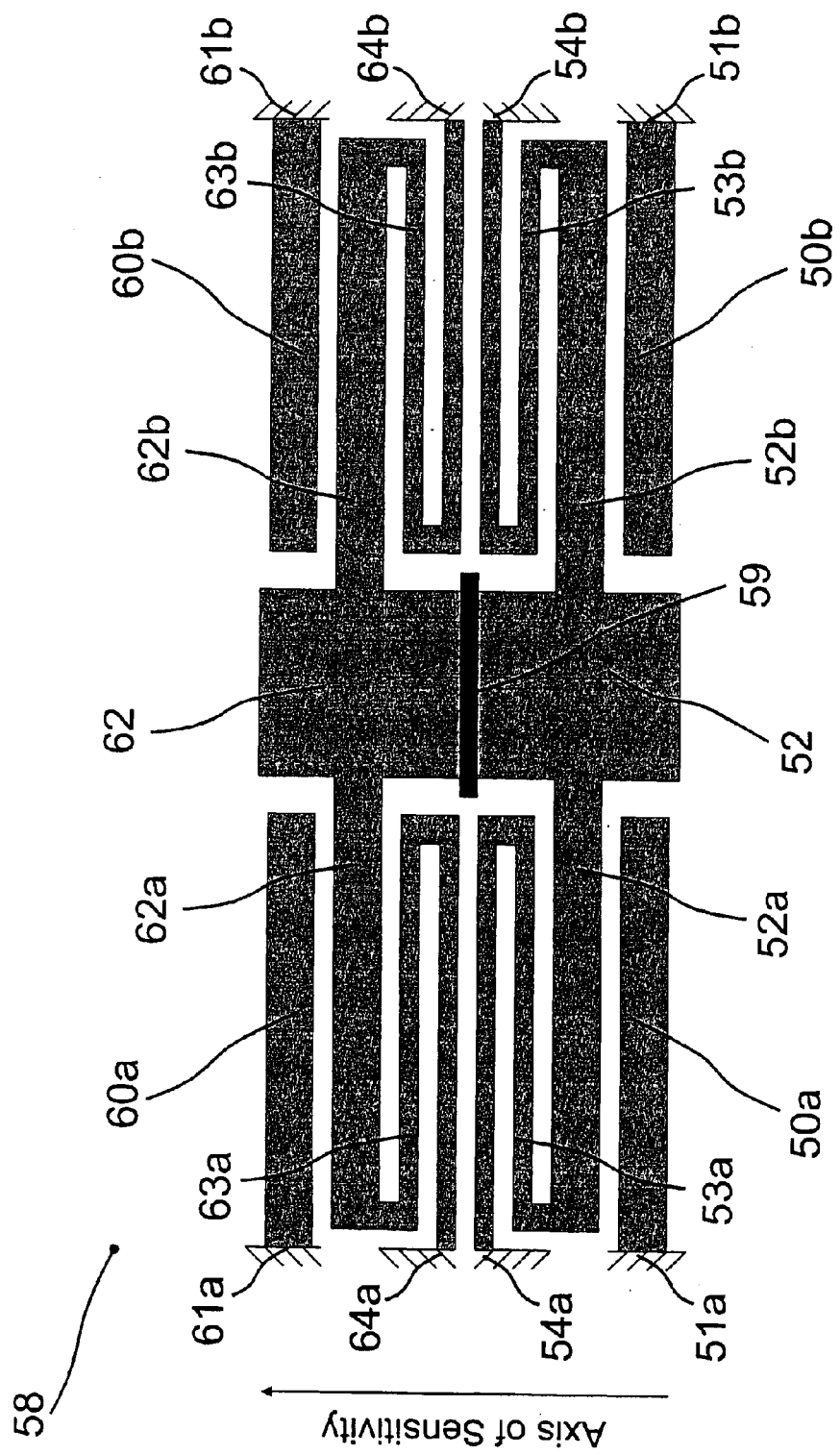
FIG. 2 is a schematic diagram of a novel proof-mass structure with dual sense capacitors.

FIG. 2 schematically illustrates a novel proof-mass structure with dual sense capacitors. The structure of FIG. 2 may be formed using a micromachining technology, for example as described in copending U.S. patent application Ser. No. 09/322,381, May 28, 1999, inventors Clark, et. al, hereby fully incorporated by reference. Gaps between capacitor electrodes are typically 0.25 to 4 microns wide, and the structure thickness is typically 2 to 50 microns thick. This novel structure comprises proof-mass sections 52 and 62, mechanically attached, but electrically isolated by a dielectric-lined isolation trench 59. Each proof-mass section includes conductive electrodes 52a,b, 62a,b that form one electrode of a substantially parallel-plate capacitor. In addition to providing a mechanical restoring force when the proof-mass undergoes a deflection, suspensions 53a,b, 63a,b provide electrical connectivity from anchor points 54a,b, 64a,b to electrodes 52a,b 62a,b. Anchor points 54a,b, 64a,b are electrically isolated from substrate 58 by dielectric-filled trenches. Although suspensions 53a,b, 63a,b include one fold to provide strain relief as illustrated, the presence of a fold is not necessary. Alternatively, to attain a structure with a low resonant frequency a number of folds may be used to increase compliance. Conductive electrodes 50a,b, 60a,b form second electrodes of substantially parallel-plate capacitors. Conductive electrodes 50a,b, 60a,b are mechanically attached to substrate 58 by dielectric-filled trenches at anchor points 51a,b, 61a,b. Thus, the structure illustrated FIG. 2 comprises a single proof-mass with capacitors formed by the following pairs of electrodes: 60a, 62a; 60b, 62b; 50a, 52a; 50b, 52b. Electrical connections may be constructed between electrodes 60a and 60b forming one sense capacitor having a value that increases for proof-mass displacements along the positive direction of the axis of sensitivity. Likewise, electrical connections may be constructed between electrodes 50a and 50b forming a second sense capacitor having a value that decreases for proof-mass displacements along the positive direction of the axis of sensitivity.

Figure 3:
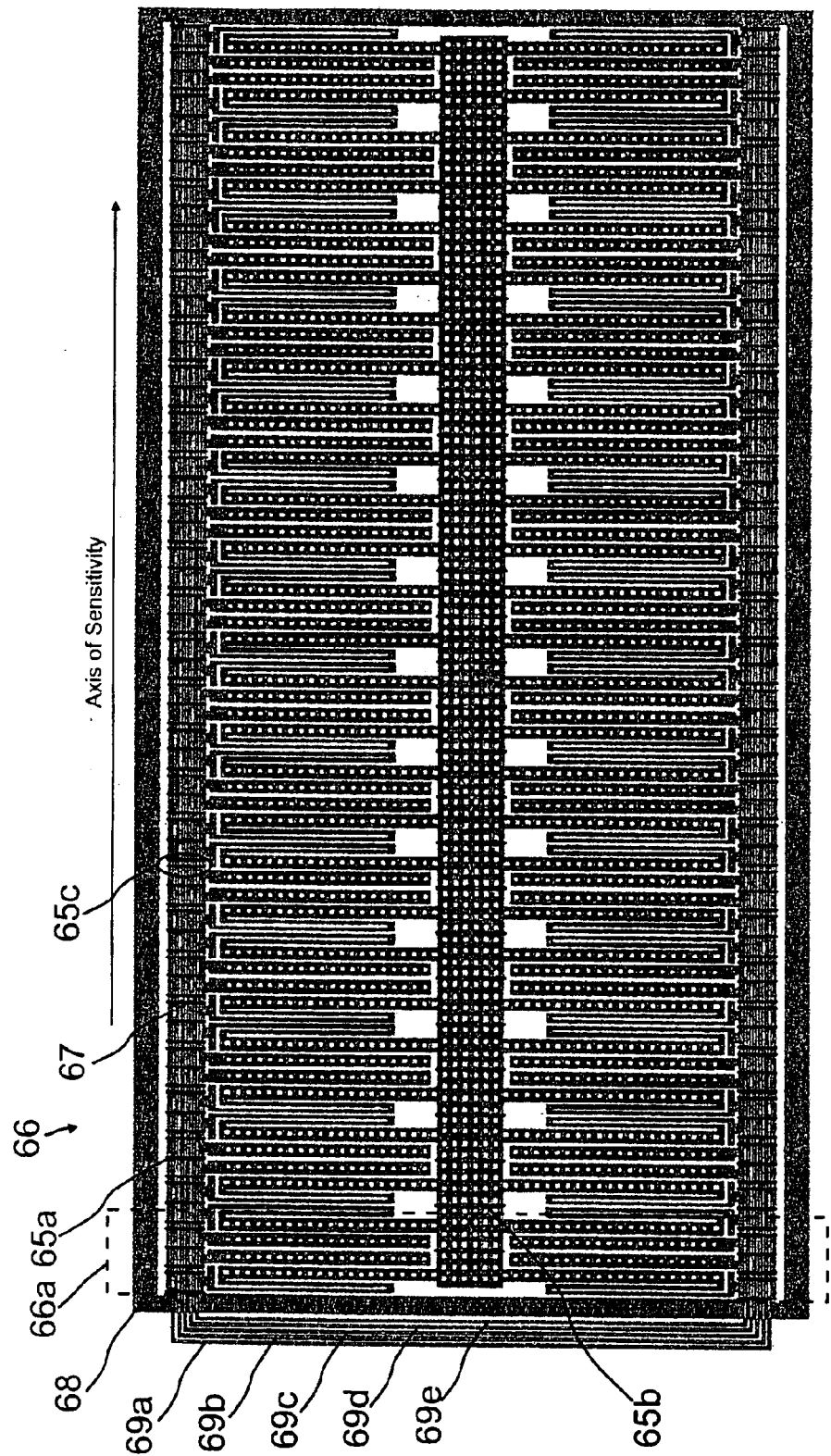
FIG. 3 is layout of a novel accelerometer having electrically decoupled sense capacitors.

FIG. 3 shows a layout of a sense-element 66 comprised of a plurality of structures 66a, similar to the structure shown in FIG. 2, for acceleration measurement. Adjacent structures 66a are isolated by additional dielectric-isolation trenches 65b. Dielectric-isolation trenches 65a electrically isolate adjacent conductive electrodes. Two isolated sense capacitors are constructed by electrically connecting like substantially parallel-plate capacitors using conductive interconnect 69a through 69e in conjunction with electrical contacts 67. Note the resulting capacitor pair has four independent terminals, each capacitor having two terminals; a first terminal pair formed by 69a,d and a second terminal pair formed by 69b,e. This is in contrast to prior-art planar sense-elements in which the proof-mass acts as a common terminal to both capacitors. For improved performance, isolation trench pair 65c, in conjunction with conductor 69c and its corresponding electrical contacts, greatly attenuates parallel parasitic-capacitance coupling with sense capacitors.

Figure 4:
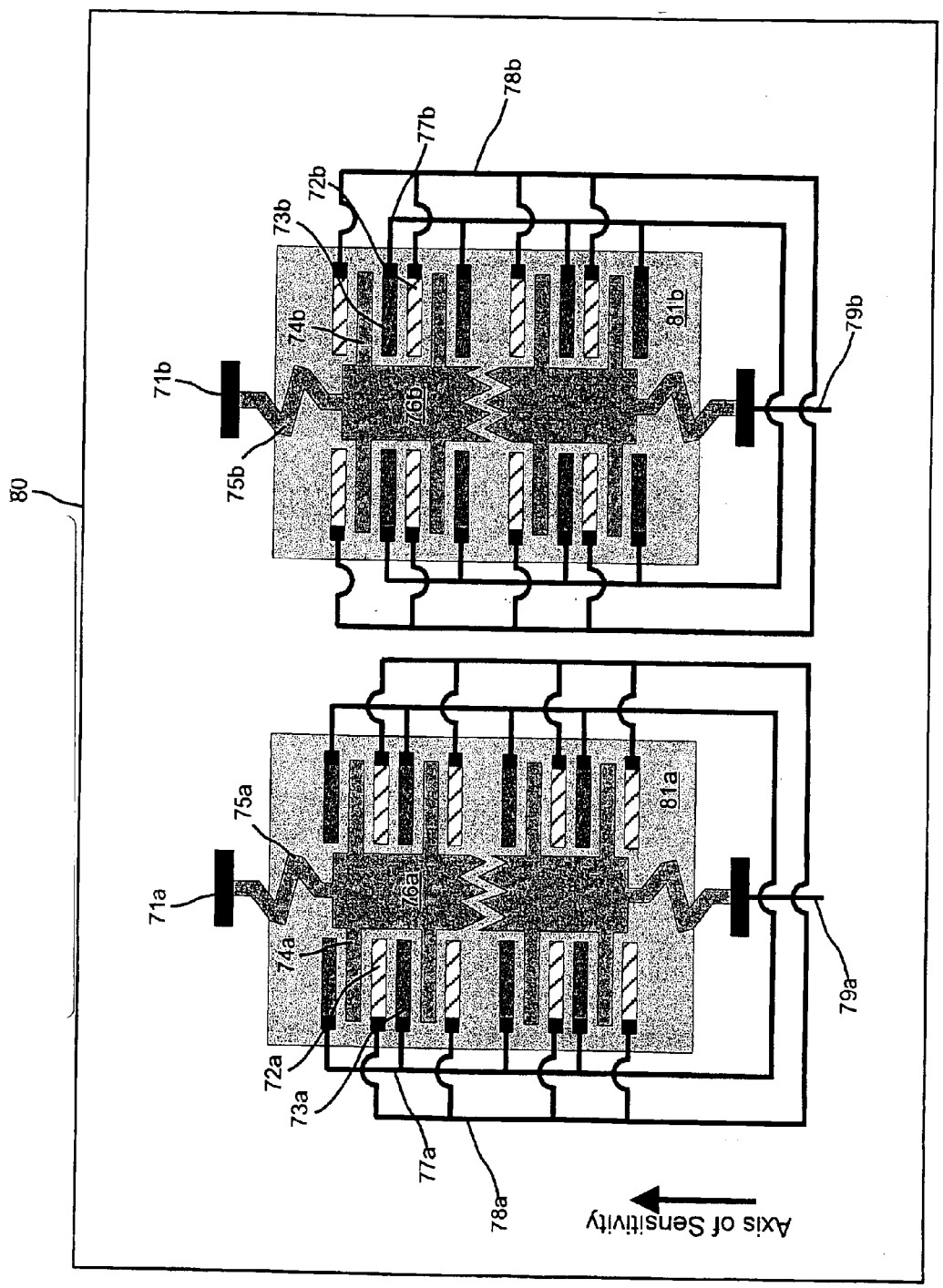
FIG. 4 is a schematic diagram of an accelerometer that measures in-plane acceleration comprising two proof-masses.

Practice of the invention does not require a single proof-mass with distinct electrical nodes; many existing fabrication technologies are unable to form proof-masses with distinct electrical nodes. (See, for example, Kung, et al., U.S. Pat. No. 5,504,026; Montague et al., U.S. Pat. No. 5,798,283; and Sherman, et al., U.S. Pat. No. 5,847,280, each of which is fully incorporated by reference herein). FIG. 4 schematically illustrates a sense element for measuring in-plane acceleration comprising two proof-masses, each proof-mass providing one sense capacitor. A sense capacitor having a value that increases for proof-mass displacements along the positive direction of the axis of sensitivity is formed by pairs of anchored electrodes 72b and electrodes 74b attached to a conductive proof-mass 76b. Like stationary electrodes are attached to one another via electrical interconnect 78b, forming one terminal of a sense capacitor. Proof-mass 76b is mechanically attached to and electrically isolated from substrate 80 via compliant suspension 75b and anchors 71b. Electrical interconnection to proof-mass 76b is attained via interconnect 79b, forming a second terminal of a sense capacitor. A sense capacitor having a value that decreases for proof-mass displacements along the positive direction of the axis of sensitivity is formed by pairs of anchored electrodes 72a and electrodes 74a attached to a conductive proof-mass 76a. Like stationary electrodes are attached to one another via electrical interconnect 78a, forming one terminal of a sense capacitor. Proof-mass 76a is mechanically attached to and electrically isolated from substrate 80 via compliant suspension 75a and anchors 71a. Electrical interconnection to proof-mass 76a is attained via interconnect 79a, forming a second terminal of a sense capacitor. Electrostatic shields 73a,b are used to ensure that only one side of each electrode 72a,b forms a capacitor with electrodes 74a,b. To minimize electrostatic forces, electrostatic shields 73a,b may be set to a DC potential similar to the proof-mass potential, with interconnect to proof-mass electrodes 79a,b being connected to the input terminals of a differential opamp in feedback thereby being kept at a substantially constant voltage. Electrostatic shields 73a,b are preferably not connected to the proof-mass since this would create a large, constant parasitic capacitance in parallel with the sense-capacitor that may cause deleterious effects as described below. Often further electrical shielding 81a,b, disposed above and electrically isolated from substrate 80, will be formed under each proof-mass to prevent, for instance, undesired electrostatic forces. In this case shielding 80 is also preferably not connected to the proof-mass since this would create a large, constant parasitic capacitance in parallel with the sense-capacitor. Instead, shielding 80 may be connected to the same DC potential as electrostatic shields 73a,b.

Figure 5:
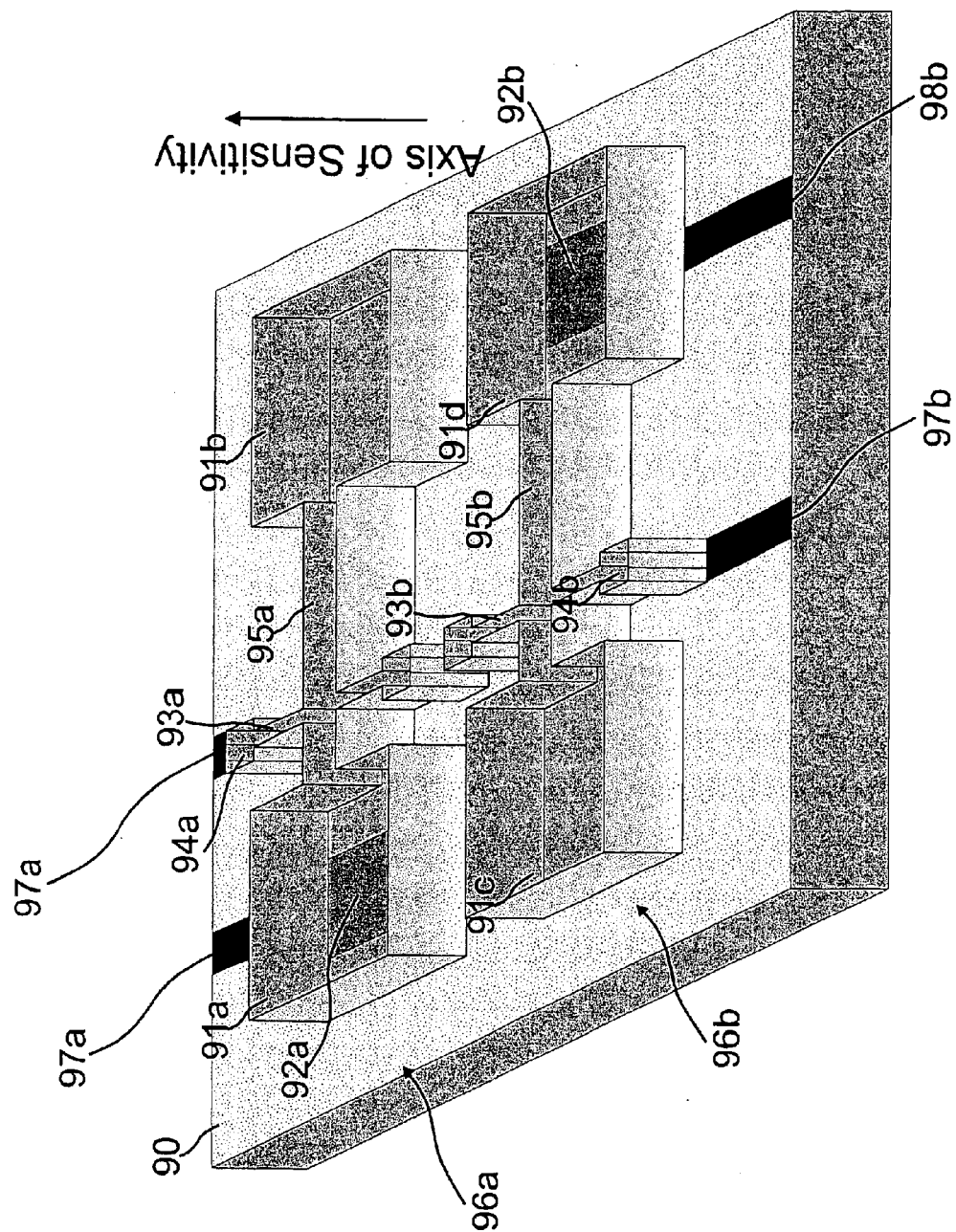
FIG. 5 is a schematic diagram of an accelerometer that measures out-of-plane acceleration comprising two proof-masses.

FIG. 5 schematically illustrates a sense element for measuring out-of-plane acceleration. This sense-element may be formed in a suitable fabrication technology such as disclosed in (Kung, et al., U.S. Pat. No. 5,504,026 issued Apr. 2, 1996; Montague et al., U.S. Pat. No. 5,798,283 issued Aug, 25, 1998; and Sherman, et al., U.S. Pat. No. 5,847,280 issued Dec. 8, 1998). First-proof mass 96a comprises two substantially planar regions 91a and 91b connected by lever 95a. Rotationally-compliant member 93a acts as a fulcrum, member 93a mechanically anchored to substrate 90 on both ends by anchors 94a. Member 93a is located closer to the center of mass of planar region 91a than the center of mass of planar region 91b. Anchors 94a provide connectivity to electrical conductors 97a,b electrically distinct from substrate 90. Due to the relative dispositions of planar regions 91a,b with respect to member 93a, when substrate 90 undergoes a positive acceleration along the axis of sensitivity the proof-mass tends to rotate clockwise as drawn. Thus, conductive region 92a, electrically isolated from and superposed to substrate 90, in conjunction with the portion of planar region 91a facing conductive region 92a, form two electrodes of a substantially-parallel plate capacitor that decreases in response to a positive acceleration along the axis of sensitivity. Likewise, conductive region 92b, electrically isolated from and superposed to substrate 90, in conjunction with the portion of planar region 91d facing conductive region 92b, form two electrodes of a substantially-parallel plate capacitor that increases in response to a positive acceleration along the axis of sensitivity. Note that for large angular displacements these sense capacitors deviate from an ideal parallel-plate capacitor due to a rotational component of motion. Improved approximation to an ideal parallel-plate capacitor may be attained by increasing the length of levers 95a,b.

Figure 6:
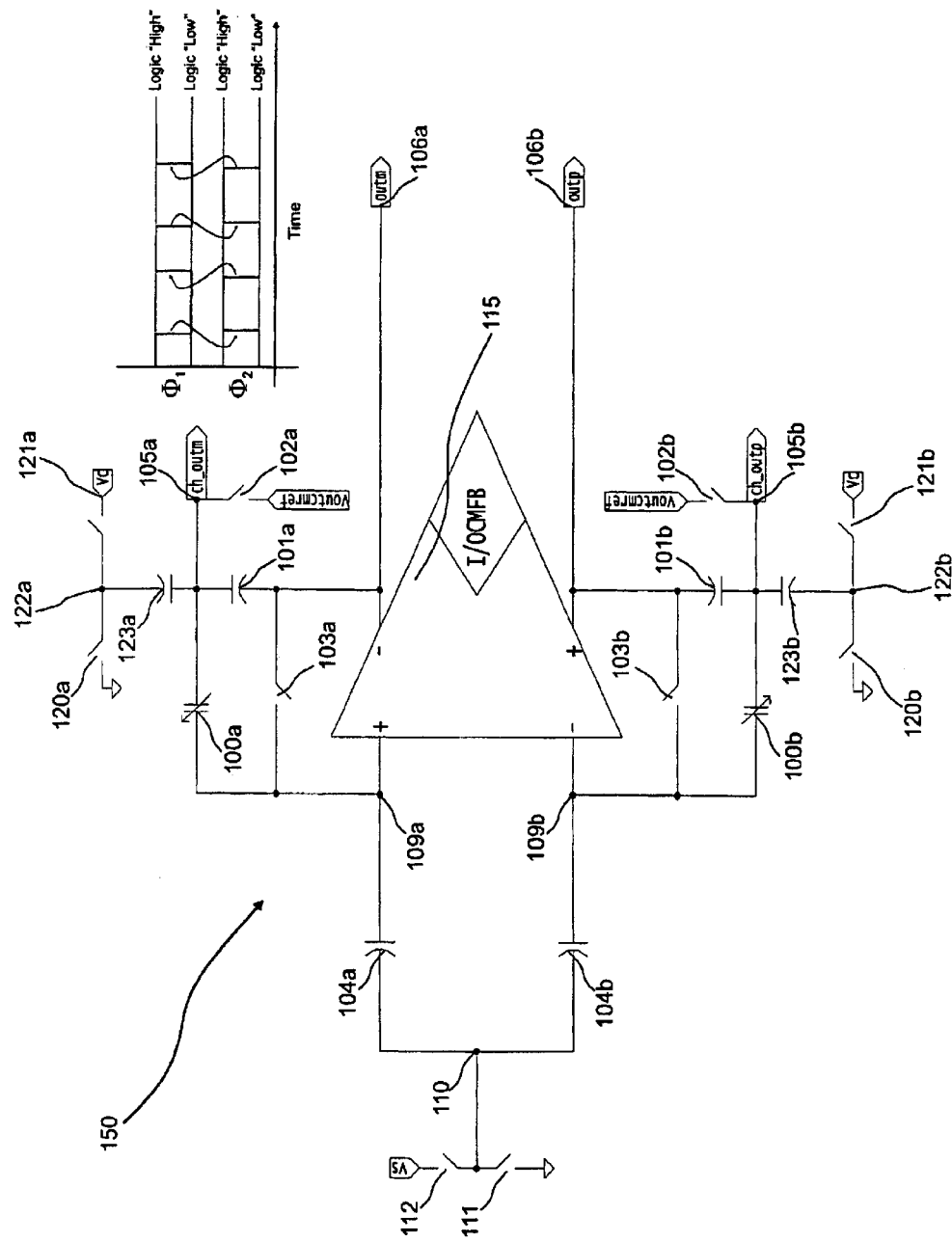
FIG. 6 is a schematic diagram of a first embodiment of the invention.

A first embodiment of the present invention is schematically illustrated in FIG. 6. In this embodiment, position sense interface 150 comprises a differential opamp 115 having an ISODCMFB circuit and a negative feedback loop, the feedback loop operating in a sampled-data, i.e. time-multiplexed, fashion. Position sense interface 150 further comprises sense capacitors 100a,b each having a nominal sense capacitance $C_s$, reference capacitors 104a,b each having a capacitance of Cref, feedback coupling capacitors 101a,b, feedforward capacitors 123a,b, output terminals 105a,b, opamp output terminals 106a,b, unity-feedback switches 103a,b, output zeroing switches 102a,b, and feedforward compensation switches 120a,b and 121a,b. Switches may be formed using, for example a NMOS transistor, a PMOS transistor, or both a NMOS and a PMOS transistor.

Position sense interface 150 operates over two recurring, discrete, nonoverlapping time periods Phi1 ($\Phi_1$) and Phi2 ($\Phi_2$). Typical period frequencies are between 1 kHz and 10 MHz. During Phi1, switches 103a,b are closed, placing opamp 115 into unity-gain feedback and setting the differential voltage at opamp input terminals 109a,b to a value substantially equal to the opamp offset plus a random component due to flicker and other noise. The ISODCMFB circuit measures the input common mode voltage and drives the output common mode voltage so that the input common mode is driven towards a reference value typically midway between the opamp output common mode voltage range, defined here as $V_{cm}$. Reference voltage $V_{cm}$ may be provided by any of a number of well known circuits for providing a constant voltage, and may be derived from a bandgap reference. Since switches 103a,b are closed, the output common mode voltage is equal to the input common mode voltage, which is driven substantially equal to reference voltage $V_{cm}$. Note that both the differential and common mode feedback loops are typically designed so that the loop gain is greater than 100. Switches 102a,b are also closed during Phi1, connecting output node 105a,b to a reference voltage $V_{outcmref}$. Note that while input nodes 109a,b have a small voltage difference due to opamp noise and offset, output terminals 105a,b are forced equal. Reference voltage $V_{outcmref}$ may be, but is not necessarily, equal to $V_{cm}$. If $V_{outcmref}$ is chosen equal to $V_{cm}$, however, only a very small error voltage component is presented across sense capacitors 100a,b during Phi1; thus, undesired electrostatic attraction is minimized. Reduced electrostatic attraction during Phi 1 results in better linearity, especially for systems with high mechanical compliance such as a low-G accelerometer. Improved linearity is due to reduced electrostatic forces affecting the proof-mass in a manner similar to a nonlinear mechanical spring. By closing switches 111 and 120a,b during Phi 1, reference capacitors 104a,b and feedforward capacitors 123a,b are initialized so that they may inject controlled amounts of charge during Phi2.

During Phi2 output nodes 105a,b are released by opening switches 102a,b, and opamp 115 is removed from unity-gain feedback and placed into charge-integration mode by opening switches 103a,b. A sense-charge pulse equal to $C_{ref}*V_s$ is generated by opening switch 111 and closing switch 112, where sense voltage $V_s$ is a constant voltage typically between 0.1 and 5 Volts. A combination of differential feedback and ISODCMFB through capacitors 100a,b and 101a,b drive input nodes 109a,b towards $V_{cm}$, integrating sense-charge onto the sense capacitors. The position-sense interface output, $V_{out}$, is equal to the voltage difference between nodes 105a,b (v(ch_outm)-v(ch_outp)), and is taken during Phi2 after the electronics have had time to properly settle. $V_{out}$ as a function of the sense capacitance $C_s$ is given by the following equation:

$$V_{out} = -V_s(C_{ref}/(C_p+C_{s+}) - C_{ref}/(C_p+C_{s-}))$$

where $C_{s+}$ and $C_{s-}$ are sense capacitors 100a,b, and $C_p$ is a term representing parasitic capacitance in parallel with sense capacitors 100a,b.

When parallel plates comprising either sense capacitor physically touch, sense capacitors are no longer acting as a capacitor and the position sensing interface ceases to function. Physical collision between the plates may have adverse consequences including sticking or welding, especially if the touching members, upon contact, have a voltage difference. Overrange collison may be prevented via equi-potential bumpers that stop movement before capacitor plates touch. Alternatively, the probability of sticking or welding may be reduced upon detection of an impending overrange by applying an equal voltage to electrodes about to collide. Impending collision may be detected, for instance, by periodically or continuouly comparing the position-sense interface output to a pre-determined threshold.

Note that in response to the voltage shift at input node 110, a large output common mode shift must occur at output terminals 105a,b. To minimize the amount of output common mode swing necessary at opamp outputs 106a,b, and enable larger values of $V_s$, switches 120a,b are opened and switches 121a,b are closed during Phi 2, applying a charge to the output terminals 105a,b via feedforward capacitors 123a,b. Voltage $V_c$ is applied to nodes 122a,b and may be a constant value that is estimated to minimize output common mode shift. Alternatively, a separate feedback loop may be used to measure shift in output common mode value in response to application of a sense-pulse and adjust $V_c$ in a fashion to drive this shift, over time, towards zero. When $V_c$ is generated using a feedback loop the feedback loop may include a switched capacitor integrator that integrates the difference in opamp output common mode voltage between before and after application of the sense pulse. Switched capacitor integrator design is well known by those skilled in the art. Injecting a feedforward charge through capacitors 123a,b to output nodes 105a,b, reduces output common-mode swing of opamp 115 and allows larger sense voltages to be used.

A further advantage of the invention is that during Phi2 substantially equal charges are applied to sense capacitors 100a,b. For the substantially parallel-plate sense capacitors used in the position sense interface, attractive force between the plates is approximately proportional to charge squared, with fringing fields and parasitic capacitance causing a slight deviation. Thus, substantially equal amounts of force are applied to both capacitors over their full range of motion, thereby greatly attenuating the effects of spring softening, electrostatic pull-in or snap-in, and nonlinear electrostatic effects inherent with constant voltage prior-art solutions.

Another advantage of the invention is that thermal noise caused by structure resistance is amplified less than prior-art position measurement interfaces. The improved noise performance arises from including the sense capacitors in the feedback loop. Prior-art interfaces amplified thermal noise by a factor dependent on the amount of parasitic capacitance Due to manufacturing imperfections there will be a certain amount of mismatch between sense capacitors, as well as between reference capacitors. Mismatch may result in an undesired offset. Scale factor will also vary due to mismatch and variations between sense capacitors and reference capacitors. Both offset and scale factor may be trimmed using two binary weighted capacitor arrays, such as that described in (M. Lemkin, B. E. Boser, "A three-axis micromachined accelerometer with a CMOS position-sense interface and digital offset-trim electronics," *IEEE JSSC*, April, 1999, pp 456–468), one array in parallel with each reference capacitor. Alternatively, if a large scale-factor trim range is necessary, the reference capacitors may be replaced by a pair of binary weighted capacitor arrays.

Figure 7:
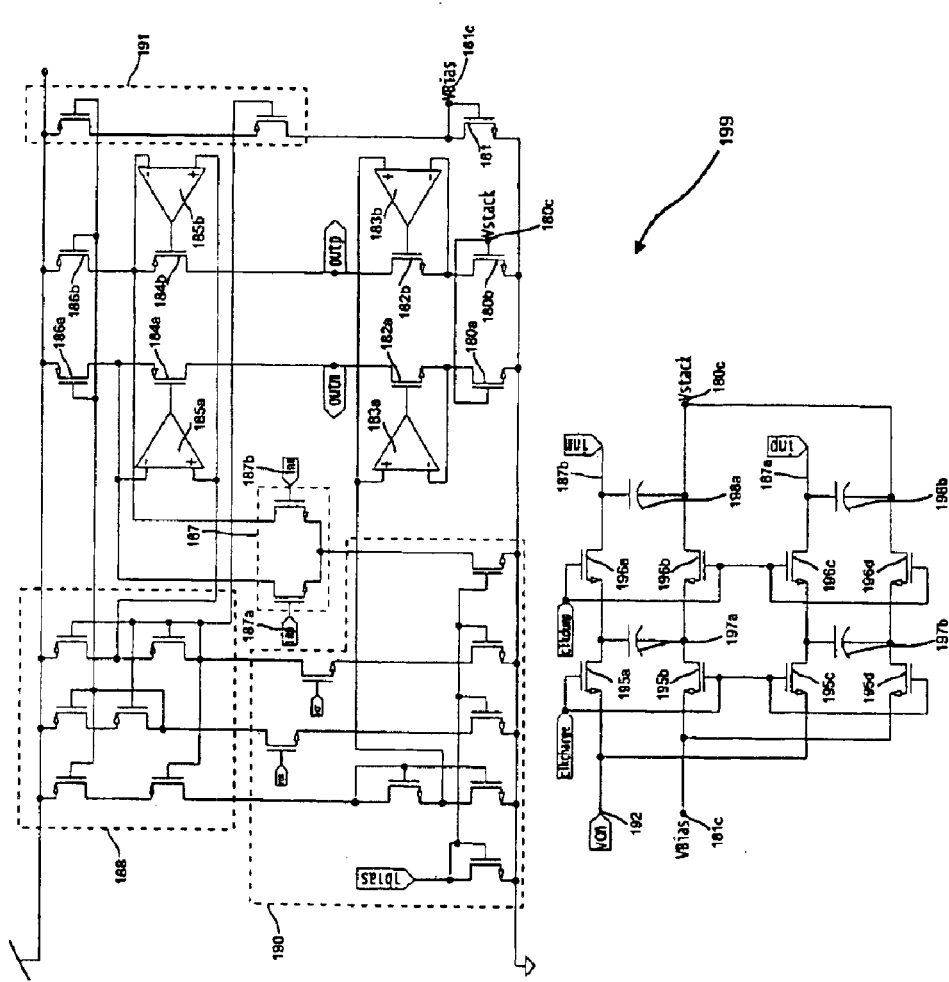
FIG. 7 is a schematic diagram of an opamp suitable for an input-sensed output-driven common mode feedback loop.

FIG. 7 shows CMOS differential opamp 199 with portion of a switched-capacitor ISODCMFB circuit. The ISODCMFB loop is closed when the opamp is used in a configuration with output to input feedback, such as shown in the first embodiment of the invention. Opamp 199 comprises NMOS bias network 190, PMOS bias network 188, differential input pair 187, PMOS current sources 186a,b, PMOS cascodes and gain-boost amplifiers 184a,b 185a,b, and NMOS cascodes and gain-boost amplifiers 182a,b 183a,b. NMOS transistors 180a,b act as adjustable current sinks to enable adjustment of output common mode. Bias stack 191 in conjunction with replica transistor 181 sets up a reference voltage at terminal 181c used in the generation of voltage applied to node 180c. Each of capacitor 198a,b is connected at one end to an opamp input terminal 187a,b, and node 180c at the other end. Capacitors 198a,b are typically chosen to be equal for symmetry. Switches 195a,b,c,d and 196a,b,c,d open and close in two, nonoverlapping phases. In conjunction with capacitors 197a,b, switches 195a,b,c,d and 196a,b,c,d set up the correct voltage across capacitors 198a,b so that when the input common-mode voltage equals $V_{cm}$, NMOS transistors 180a,b are biased at approximately the correct value. Note that in ISODCMFB, the input common-mode is measured and the output common-mode is controlled. To attain common-mode feedback, the loop must be closed external to the opamp—in a feedback network. This is in contrast to prior-art in which the output common-mode is both measured and controlled. There are certainly many different opamp configurations that may be used instead of, or in conjunction with a folded cascode topology with gain boosting, including, but not limited to: folded cascode, telescopic, class AB, constant transconductance. In fact, almost any differential opamp topology may be used, as long as the opamp includes a means for adjusting output common mode dependent on the input common-mode value. However, cascoding of the input transistors is desirable to prevent Miller capacitance from degrading linearity. Other ways of effecting an adjustable output common mode are well known by those skilled in the art including, but not limited to triode current-regulation. Note different electronic technologies may be used to form electronic circuits including CMOS, JFET, BiCMOS, or a combination thereof.

Figure 8:
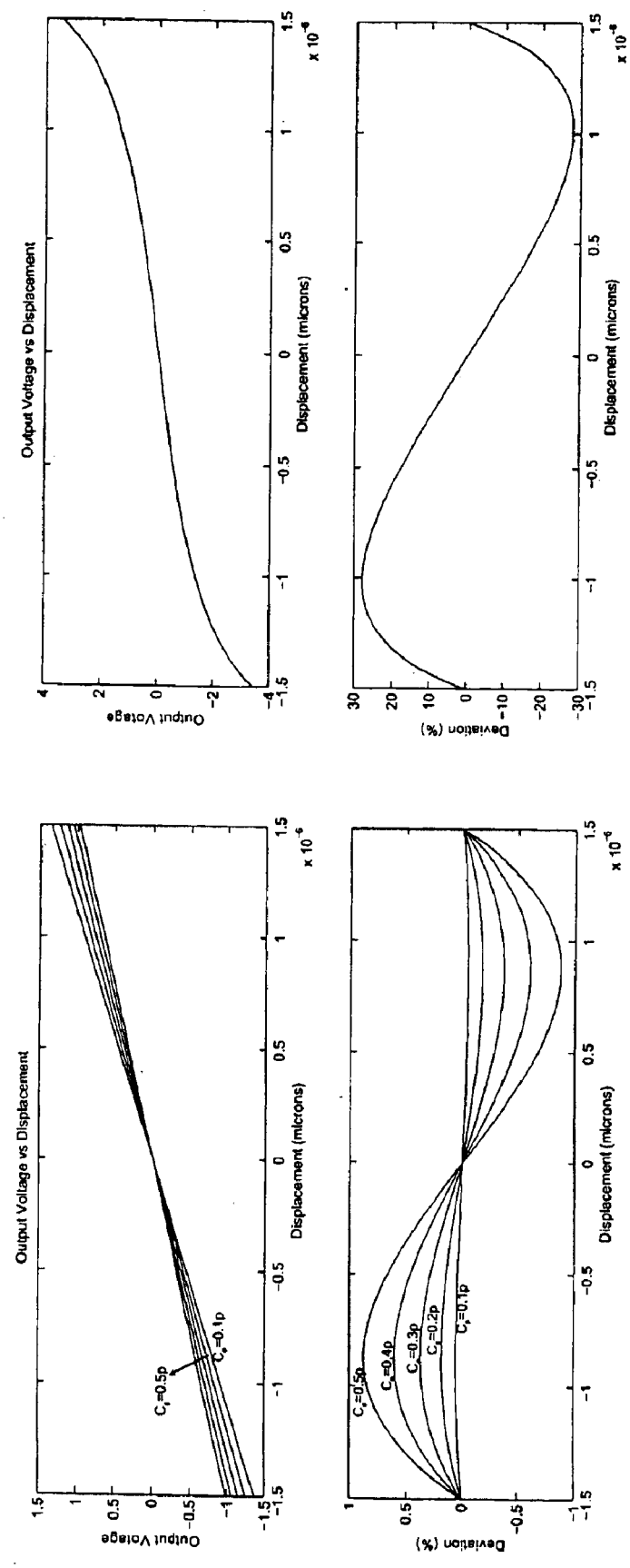
FIG. 8 are calculated plots of output vs. displacement for the present invention and a prior-art position-sense interface.

FIG. 8 shows plots demonstrating calculated nonlinearity for the present invention as compared to a conventional differential position detection interface, such as in (M. Lemkin, B. E. Boser, "A three-axis micromachined accelerometer with a CMOS position-sense interface and digital offset-trim electronics," IEEE JSSC, April, 1999, pp 456–468). Since linearity of the present invention is a function of how well sense-capacitors are modeled by an ideal parallel-plate capacitor, nonlinearity over displacement was calculated in the presence of a constant parasitic capacitance in parallel with sense capacitors. Parasitic capacitance in parallel with the sense capacitors may arise, for example, from interconnection capacitance (i.e. from two parallel metal wires) or from fringing field capacitance from structural electrodes; this parasitic capacitance is typically easy to minimize as compared to parasitic capacitance to a substrate node, for instance. Parameters for these calculations are: sense capacitance $C_s$ 2 pF each, sense voltage $V_s$ 1V, gap width 2 microns, reference capacitance $C_{ref}$ 2 pF each, $C_p$ varies between 0.1 pF and 0.5 pF. As evidenced by FIG. 8a, scale factor is slightly dependent upon parasitic capacitance in parallel with the sense capacitors. FIG. 8b shows a measure of linearity —the Integral Nonlinearity Profile, which is a plot of the deviation of the output from a straight line passing through the two endpoints of the output. Even in the presence of a parasitic capacitance of 25% the sense capacitance, linearity over closing 75% of the gap remained better than 1% of full scale. Smaller values of parasitic capacitance yield even better linearity. FIG. 8c, shows the output vs. displacement for the parasitic-insensitive approach described in Lemkin, et. al.; the transfer function is clearly quite nonlinear. FIG. 8d shows the Integral Nonlinearity Profile. Nonlinearity approaches 30% of full scale over a 1.5 micron displacement: approximately two orders of magnitude worse than the linearity attained by the present invention.

Figure 9:
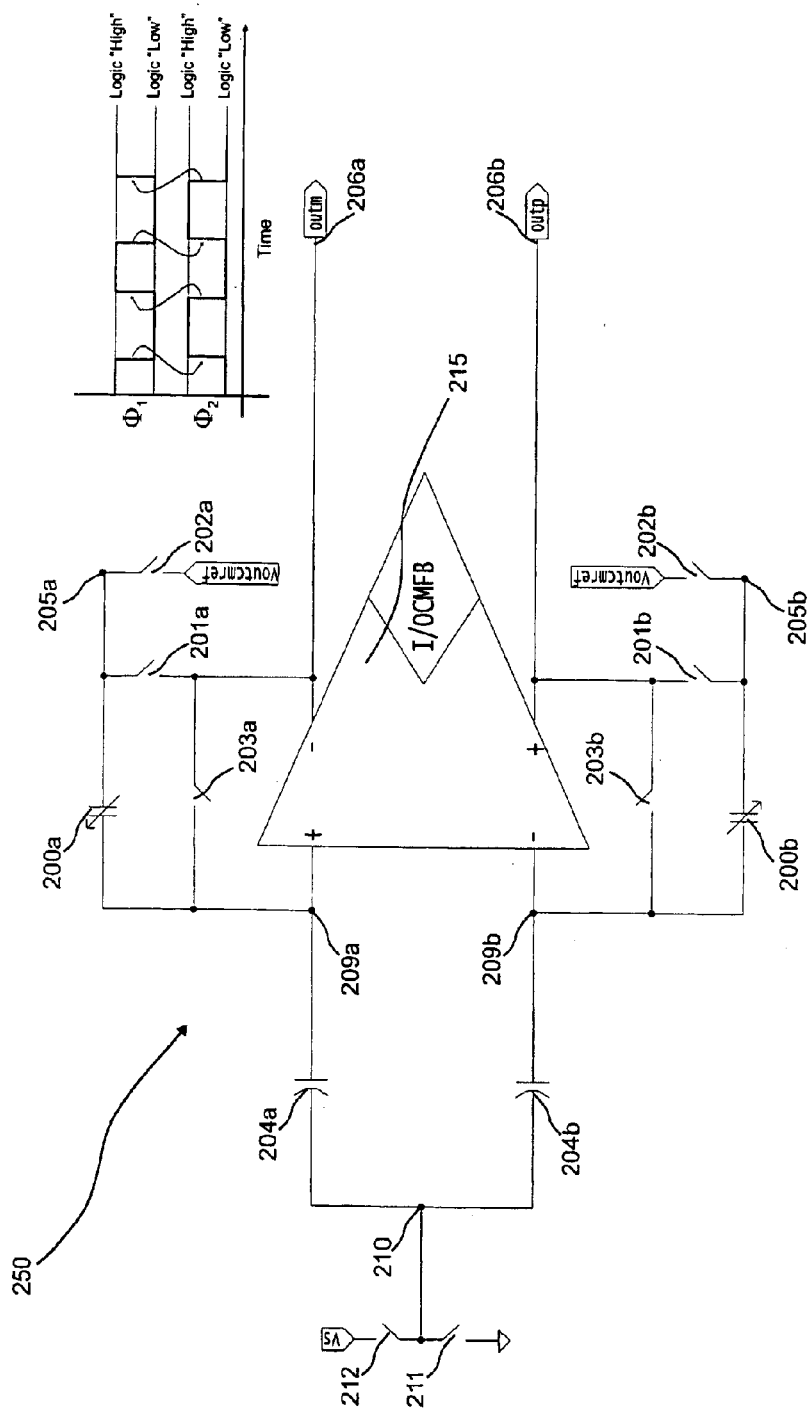
FIG. 9 is a schematic diagram of a second embodiment of the invention.

In a second embodiment of the present invention, shown in FIG. 9, feedforward capacitors are removed, enabling opamp output 206a,b to be coupled directly to sense capacitors 200a,b during Phi2. Opamp 215 may be similar to opamp 199 described in the first embodiment, and includes an ISODCMFB circuit. Offset cancellation may be maintained by including the switches 201a,b and 202a,b. However, if offset cancellation is undesired, or will be performed at a later stage, switches 201a,b may be replaced by a wire and 202a,b may be removed. Position sense interface 250 operates over two recurring, discrete, nonoverlapping time periods Phi1 ($\Phi_1$) and Phi2 ($\Phi_2$) Typical period frequencies are between 1 kHz and 10 MHz. During Phi1, switches 203a,b are closed, placing opamp 215 into differential unity-gain feedback and setting the differential voltage at opamp input terminals 209a,b to a value substantially equal to the opamp offset plus a random component due to flicker and other noise. Since switches 203a,b are closed, the output common mode voltage is equal to the input common mode voltage, which is driven substantially equal to reference voltage $V_{cm}$. Switches 202a,b are also closed (and 201a,b are open) during Phi1, connecting node 205a,b to a reference voltage $V_{outcmref}$. Note that while the input nodes 209a,b have a small voltage difference due to opamp noise and offset, output terminals 205a,b are forced equal. Reference voltage $V_{outcmref}$ may be, but is not necessarily, equal to $V_{cm}$. If $V_{outcmref}$ is chosen equal to $V_{cm}$, however, only a very small error voltage component is presented across sense capacitors 200a,b during Phi1; thus, undesired electrostatic attraction is minimized. By closing switch 211, reference capacitors 204a,b are initialized so that they may inject a controlled amount of charge during Phi2.

During Phi2 $V_{outcmref}$ is disconnected from the sense capacitors by opening switches 202a,b, and opamp 215 is removed from unity-gain feedback and placed into charge-integration mode by opening switches 203a,b and closing switches 201a,b respectively. A sense-charge pulse equal to $C_{ref} * V_s$ is generated by opening switch 211 and closing switch 212, where sense voltage $V_s$ is a constant voltage typically between 0.1 and 5 Volts. Differential feedback and ISODCMFB through capacitors 200a,b drive input nodes 209a,b towards $V_{cm}$, integrating sense-charge onto the sense capacitors. The output is taken as the voltage difference between output nodes 206a,b. Since this embodiment does not utilize feedback coupling capacitors, this embodiment typically benefits from faster settling, compared to the first embodiment. However, this embodiment does not provide for feedforward charge cancellation, and thus is limited to smaller sense-pulse voltages.

Figure 10:
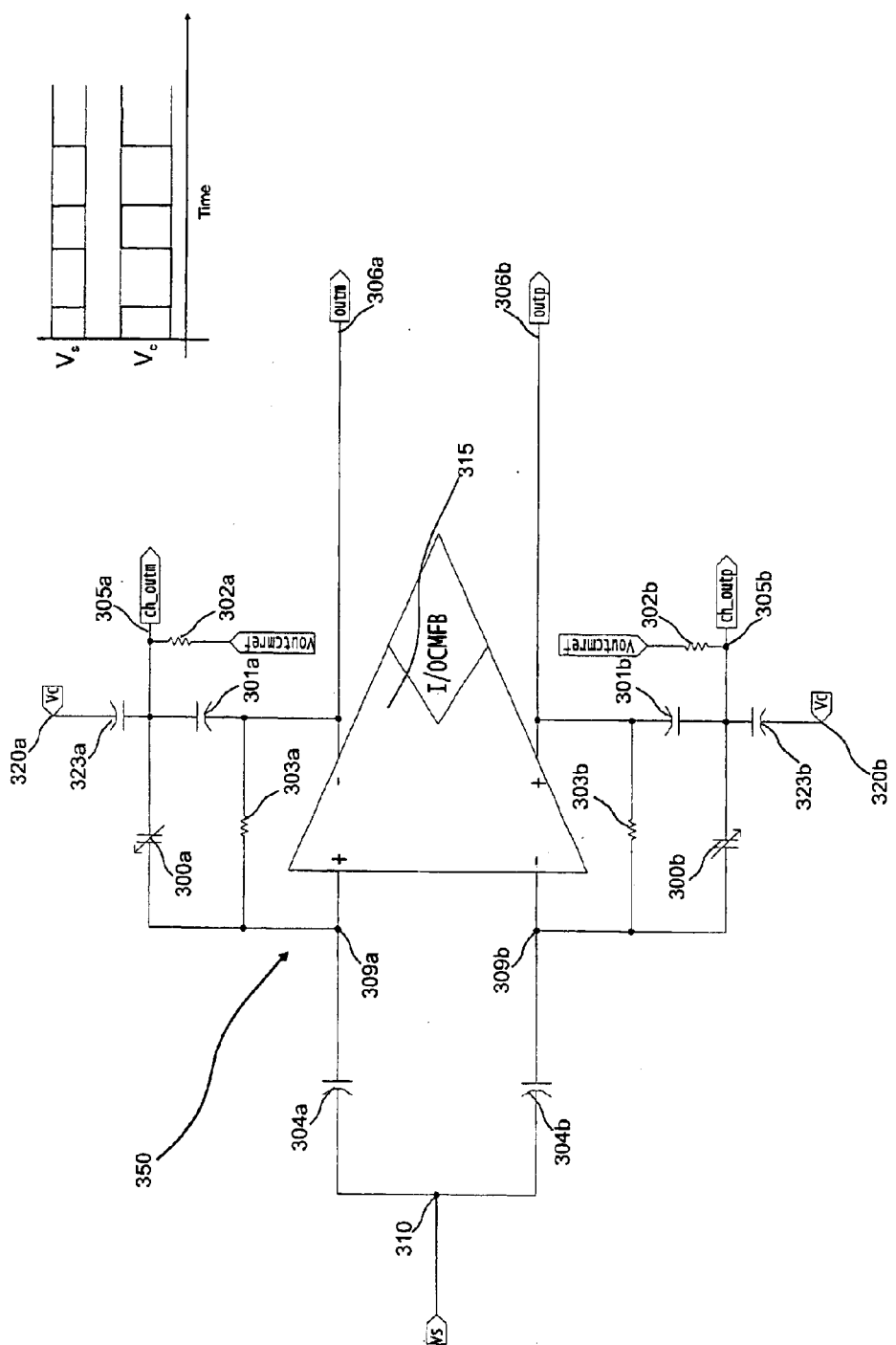
FIG. 10 is a schematic diagram of a third embodiment of the invention.

A third embodiment of the present invention is shown in FIG. 10. Position sense interface 350 operates in the continuous-time, or frequency multiplexed, domain. Opamp 315 may be similar to opamp 199 described in the first embodiment, and includes an ISODCMFB circuit. A modulation signal, which may be a sinusoid or a square wave for example, is applied to input terminal 310. Typical frequencies are between 1 kHz and 10 MHz with a magnitude from 0.1 to 5V. Resistors 303a,b are large valued and set the low-frequency voltage at the input terminals 309a,b while minimally affecting the response of the position-sense interface at frequencies close to the modulation frequency. Resistors 303a,b may be formed by a MOS transistor operating in subthreshold regime, for example. Likewise, resistors 302a,b set the low-frequency voltage at the output terminals 305a,b. The position-sense signal is reconstructed by demodulating the differential output voltage from output terminals 305a,b via a demodulator such as a synchronous demodulator synchronized to the voltage at node 310. To minimize an undesirably large output common mode shift at opamp output terminals 306a,b, a modulated feedforward charge is applied to the output terminals 305a,b via feedforward capacitors 323a,b. Modulated voltage $V_s$ is applied to nodes 320a,b and may have a constant amplitude and phase relation to the voltage at node 310, the amplitude and phase estimated to minimize output common mode shift. Alternatively, a separate feedback loop may be used to measure shift in output common mode value in response to modulation signal applied to node 310 and adjust the amplitude of modulation voltage $V_c$ in a fashion to drive this shift, over time, towards zero. When $V_c$ is generated using a feedback loop the feedback loop may include a synchronous demodulator with a continuous time integrator configured in a manner such that the difference in opamp output common-mode voltage in response to changes in the amplitude of the voltage at node 310 is first correlated with the modulation signal and then integrated over time.

Figure 11:
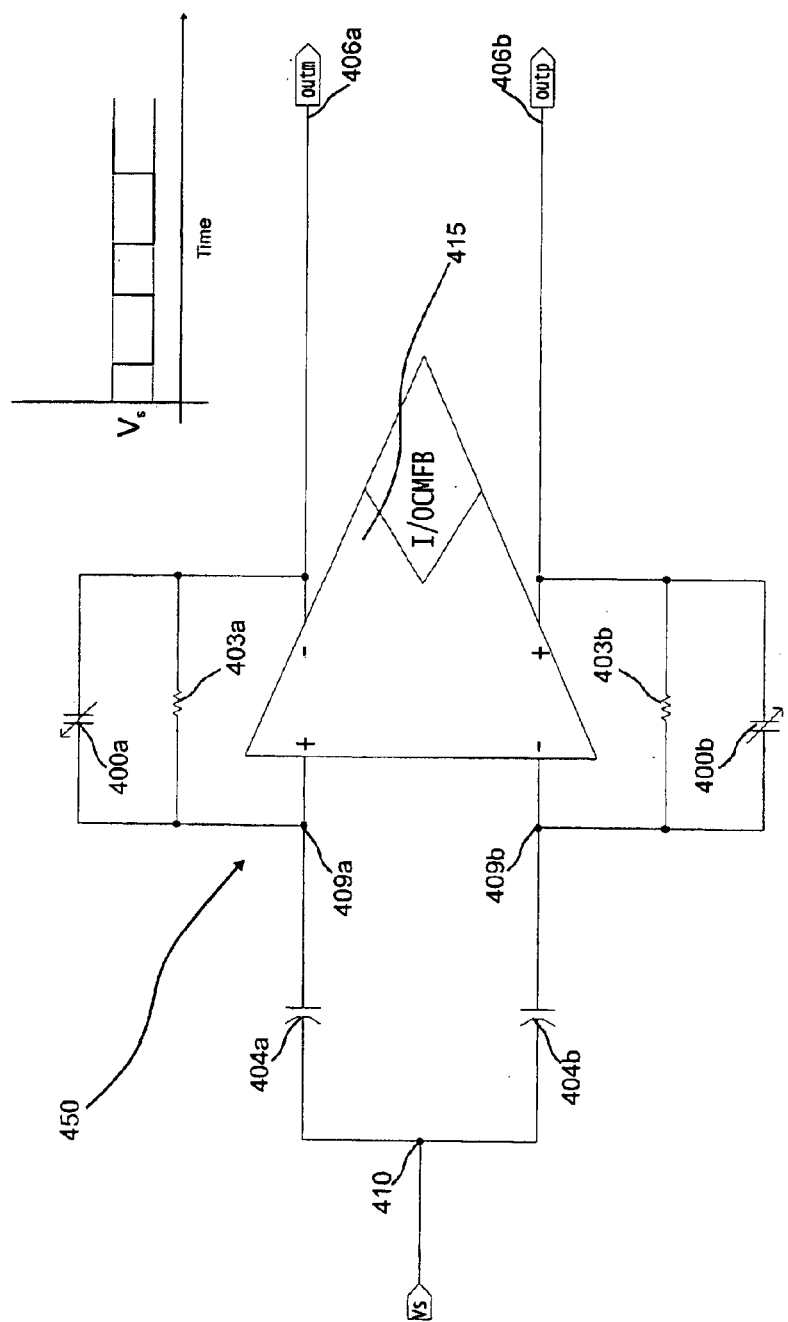
FIG. 11 is a schematic diagram of a fourth embodiment of the invention.

A fourth embodiment of the present invention is shown in FIG. 11. Position sense interface 450 operates in the continuous-time domain. Opamp 415 may be similar to opamp 199 described in the first embodiment, and includes an ISODCMFB circuit. A modulation signal, which may be a sinusoid or a square wave for example, is applied to input terminal 410. Typical frequencies are between 1 kHz and 10 MHz with a magnitude from 0.1 to 5V. Resistors 403a,b are large valued and set the low-frequency voltage at the input terminals 409a,b while minimally affecting the response of the position-sense interface at frequencies close to the modulation frequency. The position-sense signal is reconstructed by demodulating the differential output voltage from output terminals 406a,b via a demodulator such as a synchronous demodulator synchronized to the voltage at node 410.

The present invention further provides for application of a force quasi-constant over displacement, but with a controlled variation over time. In the context of the present invention, electrostatic forces acting on plates of sense capacitors are substantially independent of proof mass position. During position-sensing, nominally equal forces are applied to the proof-mass or proof-masses due to equal amounts of charge provided by reference capacitors. However, by intentionally applying unequal charges to two sense capacitors a net force may be generated. Unequal charges may be produced, for example, by applying different sense voltages to two equal reference capacitors. Advantages of using the position sense interface in a forcing capacity include: elimination of the snap-in voltage/displacement limitation of voltage-based forcing, and attenuation of spring softening nonlinearities that may cause undesired dynamic response. Note that while the forces are substantially independent of displacement, the forces are approximately dependent on the square of the sense-charge pulse and hence the voltage applied to the reference capacitors. If a linear voltage to force relationship is desired, a square-root function may be used to substantially cancel the square charge dependence. Square-root circuits are well known by those skilled in the art and may include in their implementation a translinear loop or a MOSFET.

Note that the present invention includes many alternate configurations. For example, feedforward capacitors may be switched into a capacitively-coupled output temporarily, for enough time to transfer a majority of the feedforward charge to the output nodes, and then disconnected from the sensing circuit. In this manner feedback-loop settling characteristics are improved because the capacitive loading due to the feedforward capacitors is removed after the feedforward capacitors have applied the feedforward charge. Alternatively, feedforward capacitors may be replaced by a voltage source which is temporarily switched to the output nodes, and then disconnected from the sensing circuit.

The invention may be co-fabricated with integrated circuitry on a single chip using many fabrication methods including, but not limited to: surface micromachining, reactive ion etching, SOI-based micromachining, epi-polysilicon micromachining, or similar fabrication methods or technologies. Examples of some applicable fabrication technologies may be found in, for example: copending U.S. application Ser. No. 09/543,936 filed Apr. 5, 2000; U.S. patent application Ser. No. 09/322,381, filed May 28, 1999; and U.S. Patents: Tsang et al., U.S. Pat. No, 5,326,726, issued Jul. 5, 1994; Spangler et al., U.S. Pat. No. 5,343,064, issued Aug. 30, 1994; Bashir et al., U.S. Pat. No. 5,747,353, issued May 5, 1998; Montague et al., U.S. Pat. No. 5,798,283, issued Aug. 25, 1998; Zhang et al, U.S. Pat. No. 5,506,175 issued Apr. 19, 1996; Kung, U.S. Pat. No. 5,504,026, issued Apr. 12, 1996, each of which is specifically incorporated by reference.

Alternatively, different components comprising the invention may be formed as discrete elements. For example, the sense element may be formed on a silicon or quartz substrate and the interface, control and signal processing circuitry may be formed on one or more separate substrates as described in, for example, U.S. Patents: MacDonald et al., U.S. Pat. No. 5,198,390, issued Mar. 30, 1993; Diem et al., U.S. Pat. No. 5,576,250, issued Nov. 19, 1996; and Field et al., U.S. Pat. No. 5,882,532, issued Mar. 16, 1999; as well as Smith, T. et. al., "A 15b Electromechanical Sigma-Delta Converter for Acceleration Measurements," ISSCC Dig. Tech. Papers, pp. 160–161, 1994, each of which is specifically incorporated by reference. Alternatively, the sense-element may be bulk-micromachined by any of a number of well known methods, interface, control and signal processing circuitry may be formed on one or more separate substrates, and the electrical and mechanical substrates may be connected by one or more wire bonds.

The foregoing description, for the purposes of explanation, used specific nomenclature, terminology and dimensions to provide a thorough understanding of the invention. However, it will be apparent to one skilled in the art that the specific details are not required in order to practice the invention. Thus, the foregoing descriptions of specific embodiments of the invention are presented for the purposes of illustration and description. The embodiments were chosen and described in order to best explain the principles of the invention and its practical applications, to thereby enable others skilled in the art to best utilize the invention and various embodiments with various modifications as are suited to the particular use contemplated. They are not intended to be exhaustive or to limit the invention to the precise forms disclosed; obviously many modifications and variations are possible in view of the above teachings. For example, the sense-element need not necessarily be micromachined; the invention may be included in a larger system comprising a force feedback loop; the invention may be included in a larger system comprising additional signal processing circuitry; the sense-interface may be mixed domain, meaning the sense-interface may be substantially frequency-multiplexed, with periodic resets occurring to reset the input common mode voltage, a reset comprising a period in which one or more switches are briefly closed and subsequently opened or vice versa.

What is claimed is:

1. A position sense interface for a micro-mechanical element, comprising:
a substrate;
at least one proof mass, said at least one proof mass including a first proof mass having a first section electrically isolated from a second section;
at least a first and a second electrically decoupled sense capacitors, said first capacitor comprising at least a first independent terminal on said first section of said first proof mass and a second independent terminal on said substrate, said second capacitor comprising at least a first independent terminal on said second section of said first proof mass and a second independent terminal on said substrate; and position detection circuitry comprising a differential charge integrator with input-sensed, output driven feedback, said position detection circuitry detects a position of said at least one proof mass.

2. The position sense interface of claim 1 wherein said integrator includes an operational amplifier having an input and an output, and an input sensing, output driving feedback circuit.

3. The position sense interface of claim 1, further comprising:

at least one switch in communication with said position detection circuitry;

wherein said position detection circuitry operates over a first non-overlapping time period when said at least one switch is in a first position and a second non-overlapping time period when said at least one switch is in a second position.

4. The position sense interface of claim 2 wherein the feedback is common mode.

5. The position sense interface of claim 2 wherein the differential charge integrator senses common mode.

6. The position sense interface of claim 2 wherein the feedback circuit is a time multiplexed feedback circuit.

7. The position sense interface of claim 2 wherein the feedback circuit is a frequency multiplexed feedback circuit.

8. The position sense interface of claim 2 wherein the feedback circuit is a continuous-time feedback circuit.

9. The position sense interface of claim 1 further including means for providing a compensating charge on each said sense capacitor.

10. The position sense interface of claim 1 further including a first and a second reference capacitor.

11. The position sense interface of claim 10 wherein said first and said second reference capacitor are substantially equal.

12. The position sense interface of claim 10 further including at least one binary weighted capacitor array in parallel with at least one reference capacitor.

13. The position sense interface of claim 10 wherein a charge is applied to said position detection circuitry by a changing voltage applied to said reference capacitors.

14. The interface of claim 1, wherein at least one of said sense capacitors is formed as part of a micromechanical structure formed in or on said substrate; and said position detection circuitry is formed in and on said substrate, and includes an operational amplifier and a negative feedback circuit.

15. The interface of claim 15 wherein said micromechanical structure further includes a second proof mass.

16. The interface of claim 15 wherein said first and second sense capacitors are coupled in said feedback circuit.

17. The interface of claim 14 wherein:

said operational amplifier includes at least a first input; and said position sense interface includes means for applying a first signal to said feedback circuit to place said operational amplifier in unity gain feedback during a first non-overlapping time period.

18. The interface of claim 14 wherein said means includes means for applying a second signal to said feedback circuit to place said operational amplifier in a charge integration mode during a second non-overlapping time period.

19. A position sense interface for a micro-mechanical element, comprising:

a substrate;

at least one proof mass;

at least a first and a second electrically decoupled sense capacitors, each of said first and second capacitors comprising at least a first independent terminal on said at least one proof mass and a second independent terminal on said substrate; and position detection circuitry comprising a differential charge integrator with input-sensed, output driven frequency multiplexed feedback, said position detection circuitry detects a position of said at least one proof mass.

* * * * *

UNITED STATES PATENT AND TRADEMARK OFFICE
CERTIFICATE OF CORRECTION

PATENT NO. : 6,868,726 B2  Page 1 of 1
DATED : March 22, 2005
INVENTOR(S) : Lemkin et al.

It is certified that error appears in the above-identified patent and that said Letters Patent is hereby corrected as shown below:

Column 14,
Line 11, delete "15" and substitute with -- 14 --.

Signed and Sealed this

Eighth Day of November, 2005

JON W. DUDAS
*Director of the United States Patent and Trademark Office*